Feb. 25, 1969   J. T. RUSSELL   3,429,184
GRAVITY METER
Filed May 27, 1965   Sheet 1 of 4

INVENTOR.
BY  JAMES T. RUSSELL

INVENTOR.
JAMES T. RUSSELL
BY

Feb. 25, 1969

J. T. RUSSELL 3,429,184

GRAVITY METER

Filed May 27, 1965

INVENTOR.
JAMES T. RUSSELL
BY

United States Patent Office 3,429,184
Patented Feb. 25, 1969

3,429,184
GRAVITY METER
James T. Russell, Richland, Wash., assignor to the United States of America as represented by the United States Atomic Energy Commission
Filed May 27, 1965, Ser. No. 459,485
U.S. Cl. 73—382        9 Claims
Int. Cl. G01p *15/00;* G01m *1/12;* H01s *3/00*

ABSTRACT OF THE DISCLOSURE

A half reflecting transparent surface divides the light output of a continuous laser into a vertical beam directed towards a free-falling reflector in a vessel holding a vacuum and a reference beam directed towards a stationary reflector. A prism, disposed in the paths of the reflected beams, combines the reflected beams into one beam thereby producing a changing interference fringe pattern due to the movement of the free-falling reflector. A photodetector monitoring the interference fringe pattern produces an output voltage representative thereof. A voltage to frequency converter receiving the photodetector output produces a pulsed output having a repetition rate representative of the input voltage. The output of the voltage to frequency converter is stored during consecutive and equal time intervals in different binary counters. The difference in binary output of the counters is then representative of the acceleration of the free-falling reflector due to gravity.

---

This invention relates to gravity meters and particularly to an interferometer adapted for operation with a laser light source for the measurement of the acceleration of gravity.

Various gravity meters are known in the art for measuring the acceleration of gravity while the measuring instrument is positioned on the surface of the earth. There are three general methods used to measure the acceleration of gravity commonly known as the pendulum, the spring balance and the falling body technique.

The pendulum method suffers from temperature effects, timing variations, and knife edge adjustments. At present, in a laboratory method, an absolute accuracy of about two or three parts in $10^6$ can be attained by the pendulum method.

Most survey and prospect work is done with a spring balance instrument. There are many configurations but they can all be thought of as simply a weight on a coil spring. Spring balance instruments are rugged, portable and very sensitive. The sensitivity can be one part in $10^9$. However, these devices only give relative readings having a limited non-linear range. They must be calibrated with a pendulum, so the absolute accuracy can be no better than the pendulum. Spring balance instruments are subject to severe drifts. In general, they can be expected to be stable over 24 hours to one part in $10^7$ or one part in $10^5$ over extended periods.

Educational apparatus have employed a falling body technique wherein two vertical electrical conductors are insulated from each other. Disposed between the two electrical conductors is a record strip. The educational devices employ means for creating a high potential difference between the two conductors at equal time intervals. An electrical conducting means is permitted to fall between the two conductors, thereby creating a moveable low resistance pathway between the two conductors enabling the means creating the potential difference to cause sparks for perforating the record strip at equal time intervals. The accuracy of the falling body spark apparatus depends on the timed accuracy of the spark generating means, and the ability to measure the distance between the perforations in the recording strip. Due to the length of time of the spark and the diameter of the perforation on the record strip, the spark method is limited to the order of 1% accuracy. Improvements can be made such as longer drop lengths and an evacuated column, but the ultimate accuracy will be at best one part in $10^3$.

Another falling body method which is an adaptation of the spark method is to drop a marked rod and photograph the marks with a series of precisely times flashes. The accuracy of the method is $\pm 1.5$ parts in $10^6$. The accuracy of the method is limited by the calibration of the rod, fabrication of absolutely straight rod, adapting the flash lamp so as to fire on time and with a short enough flash, magnetic and thermal effects on the rod, and relative motion between the camera and the rod index. The photographed falling rod method is a complex laboratory instrument unadapted for survey and prospect work.

Another falling body method utilizes a falling magnetic body against which is transmitted ultra-high radio signal from an antenna. As the body falls a given distance, equal to the wave length of the signal, a standing wave or resonance is established. The rate at which the standing wave occurs is directly proportional to the velocity at which the object falls, and therefore, is proportional to the acceleration of gravity. The standing wave method is subject to drifting and lack of long term stability, resulting in an accuracy of one part in $10^4$. In that the falling magnetic body method depends upon the detection of each resonance of the microwave energy in the wave guide, the accuracy depends upon the resonance detecting circuits. The resonance detecting circuits must detect the corresponding points on the side of each resonance. Variations in resonance amplitude and variations in the slope of the resonance will cause variations in the resonance location.

Accordingly, it is an object of the present invention to provide an optical apparatus for measuring the acceleration of gravity.

It is another object to provide a survey and prospect instrument that is rugged and semi-portable.

It is another object to provide a continuous wave laser as the standard of length for the measurement of the acceleration of gravity.

It is another object to provide long term stability of an instrument for the measurement of the acceleration of gravity.

It is another object to provide an instrument with an absolute accuracy of one part $10^7$.

It is another object to provide an instrument for the measurement of the acceleration of gravity that is insensitive to temperature changes.

It is another object to provide an instrument that is not dependent upon laboratory conditions.

It is a further object to provide an instrument which would allow rapid measurements.

The present invention is an optical device for measuring the acceleration of gravity on a freely falling optical reflector. The apparatus consists of a vertical vessel capable of holding a vacuum through which a tetrahedral is dropped. A continuous wave laser projects a beam of light against an optical element provided with a semi-transparent beam dividing interface so as to divide the entrant beam into two beams. One of the beams is directed upon and returned to the interface by the falling tetrahedral. The other divided beam is directed upon and returned to the interface by another reflective optical element. The two returned beams form interference fringe patterns at the interface which are detected by a photomultiplier. Electronic means are employed to indicate the movement in an interval of time of the tetrahedral prism with respect to the dividing means which is proportional to the force of gravity. With the presnt invention the absolute accuracy would be one part in $10^7$ with the possibility of obtaining a sensitivity of one part in $10^9$ for a survey instrument. Accuracy of the measuring apparatus depends only on the time signals and the laser wave length. The particular laser wave length would be compared interferometrically once with the Krypton International Standard to measure the wave length of the particular optical line to be used. After the laser wave length is determined the accuracy of the measuring apparatus is not dependent on laboratory conditions.

Various other objects and advantages will appear from the description of the following embodiment of the invention and the novel features will be pointed out hereinafter in connection with the appended claims.

Figure 1:
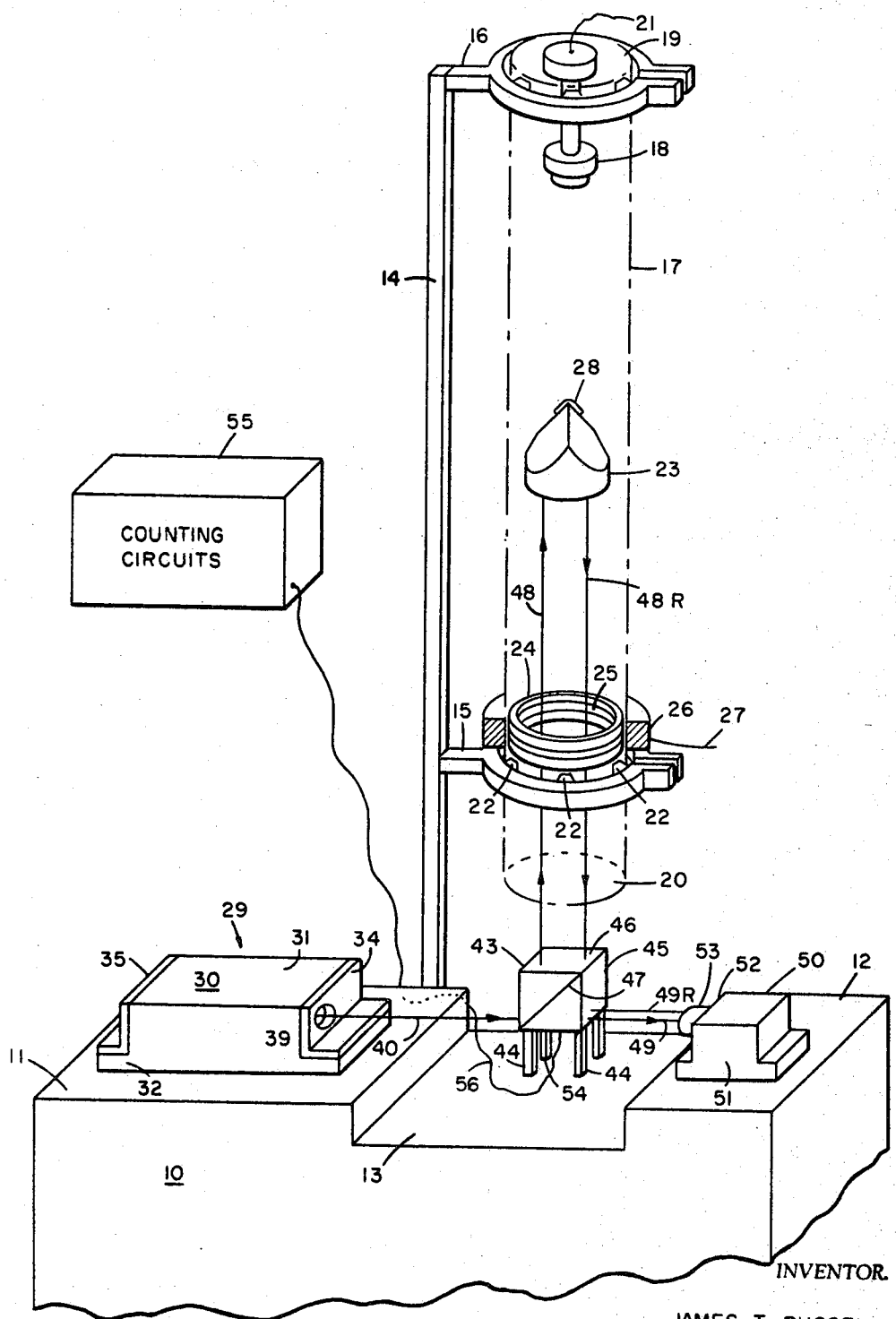
FIGURE 1 is a fragmentary perspective side view of the gravity meter of this invention.

In the illustrated embodiment of the invention, a base 10 is formed with a first integral raised portion 11 and a second integral raised portion 12 so as to define a non-raised region 13 between raised portions 11 and 12. Base 10 further carries an upright column 14 having a first support member 15 and a second support member 16. Carried by first support member 15 and second support member 16 is an upright non-magnetic vessel 17 disposed over region 13, capable of holding a vacuum. Vessel 17 has a closure 19 at its uppermost end and an optical transparent closure 20 at its lower end. The vacuum within vessel 17 should be as great as possible. Vessel 17 may be evacuated and sealed or a vacuum pump (not shown) could be connected to vessel 17 for continuous evacuation of the vessel. Means for evacuating and maintaining the desired vacuum are apparent to those skilled in the high vacuum art. An electromagnet 18 is disposed in closure 19 and sealed thereto to preserve the vacuum in vessel 17. An electrical conductor 21 is provided for connecting electromagnet 18 to a source of electrical power (not shown). The length of vessel 17 is not critical, but a length of 20 feet is preferable.

Disposed in vessel 17 and adapted for free fall therein is a tetrahedral prism 23. Disposed above and adjacent to first support member 15 on stop members 22 is ring shaped catcher and elevator element 24, for tetrahedral prism 23. Catcher 24 is preferably a rubber annular ring adapted to slide within vessel 17. Catcher 24 is provided with an annular groove having a metallic ring 25 disposed therewithin. An electromagnet 26 shaped like a ring is slidably disposed over the outside of vessel 17 and rests on lower support member 15. Electrical conductors 27 connect electromagnet 26 to a source of electrical power (not shown) so as to position catcher element 24 within vessel 17. Tetrahedral prism 23 is provided with a magnetic coating 28 at the vertex of the prism so that the tetrahedral prism 23 may be disposed at the upmost end of vessel 17 adjacent closure 19 by means of electromagnet 18.

Figure 4:
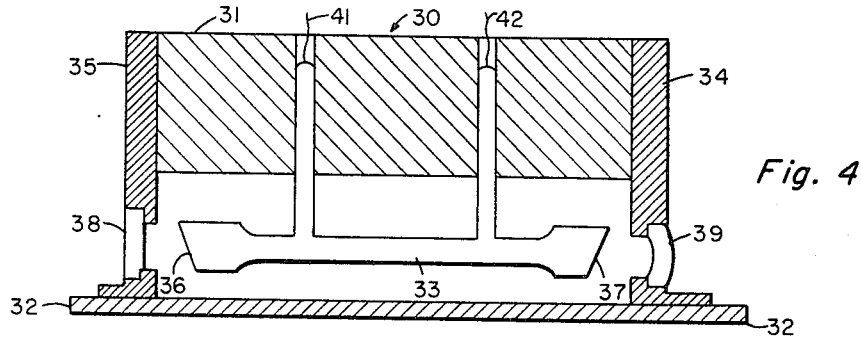
FIGURE 4 is a side elevation, in section, of a continuous wave laser light source for the interferometric measuring of the acceleration of gravity upon a falling body.

For determining the extent of movement of tetrahedral prism 23 with respect to the base 10, an optical assembly 29 is provided. The optical assembly 29 comprises a laser 30 having a housing 31 defining an elongated base section 32. Base section 32 is securely attached to raised portion 11 of base 10. Laser 30 is a helium-neon continuous wave laser operating on wave length of 6328 angstroms. To provide the accuracy required in the measurement of the acceleration of gravity it is necessary to employ a continuous wave laser as the light source. This is because of the required coherence length of the photon packet. In that light amplification by stimulated emission of radiation has become well known, it is necessary only to provide a description of a laser for the preferred embodiment described herein. As may be seen in FIGURES 1 and 4, laser 30 comprises a plasma tube 33, positioned between housing closure members 34 and 35, having formed therewith optical windows 36 and 37 inclined at Brewster's angle. Housing closure member 35 is provided with an "end reflecting" mirror 38 adjacent to optical window 36. Housing closure member 34 is provided with a combined spherical reflector and collimating lens 39 for projecting a collimated monochromatic beam of light 40. As previously stated, plasma tube 33 contains helium and neon which is excited by applying current to input connectors 41 and 42 from an appropriate electrical source (not shown) in a manner well known. Upon excitation, light is reflected back and forth between reflector 38 and reflector 39 resulting in a coherent monochromatic beam of light 40 emitted by spherical reflector and collimating lens 39.

Disposed in the beam of light 40 emitted by the continuous wave laser 30 is an optical light dividing means 43. Beam splitting prism 43 is disposed in beam 40 by mounting the prism atop stand posts 44. The lowermost end of stand posts 44 are secured to the non-raised region 13 of base 10 between the first and second integral raised portions 11 and 12. Optical light dividing means 43 is preferably formed of two haves 45 and 46 of a diagonally-cleaved cube, rejoined after partially, e.g., 30 percent silvering the diagonally-cleaved surface so as to form a semi-silvered beam dividing interface 47. Prism 43 divides entrant light beam 40 into two components, a measuring beam 48 and a reference beam 49. Reference beam 49 proceeds straight through the prism 43 with no deflection in direction. Measuring beam 48 comprising the part of the beam reflected by the 30 percent silver interface 47 is directed out of the beam at a 90° angle to the path of entrant beam 40 towards optical transparent closure member 20 of vessel 17. Measuring beam 48 penetrates closure 20 and is received by tetrahedral prism 23. As well known in the art, tetrahedral or "corner cube" prism is provided with three orthogonal converging angular faces towards its rearward end. Tetrahedral prism 23 is so adapted for free fall within vessel 17 so as to receive beam 48 which is then internally reflected three times, displaced laterally, and reflected outwardly as a returning measuring beam of light 48R along a path parallel to beam 48 to the optical light dividing means 43. As it is well known in the optical art, tetrahedral corner cube prisms are insenstive to small motion about their optical center. That is to say that rotary movement of a tetrahedral prism about its optical center of lateral displacement of the prism perpendicular to an entrant beam of light have no effect upon the optical path presented by the tetrahedral prism. Thus, alignment in an interferometer is preserved through their employment.

Optical assembly 50 is disposed within the path of reference beam 49 which proceeded straight through beam dividing prism 43. Optical assembly 50 comprises a housing 51 which secured to the second integral raised portion 12 of base 10 defines a plane surface 52. A tetrahedral or "corner prism" 53 is secured within a bored out section of plane surface 52 of housing 51 for receiving reference beam 49 directed from optical beam dividing means 43. Tetrahedral prism 53 is adapted to receive beam 49, which is internally reflected three times within prism 53 accordingly displaced and directed outwardly along a reflected reference beam path 49R parallel to beam 49 to the optical light dividing means 43 to be combined with the reflectively returned measuring means 48R at the semi-silvered beam dividing interface to provide interference fringe patterns.

Secured to the optical light dividing means 43 and adapted to be actuated by the fringe patterns is a single photodetector means 54. The electrical output of photodetector is transmitted to a unidirectional counting circuit 55 via electrical conductors 56. Thus light reflected from the tetrahedral prism 23 results in fringes actuating photodetector 54 so that counting circuits 55 indicates the extent of movement of prism 23 with respect to light dividing means 43. A detailed description of the electronic circuits and the operation thereof indicative of the acceleration of gravity will be described hereinafter.

Figure 2:
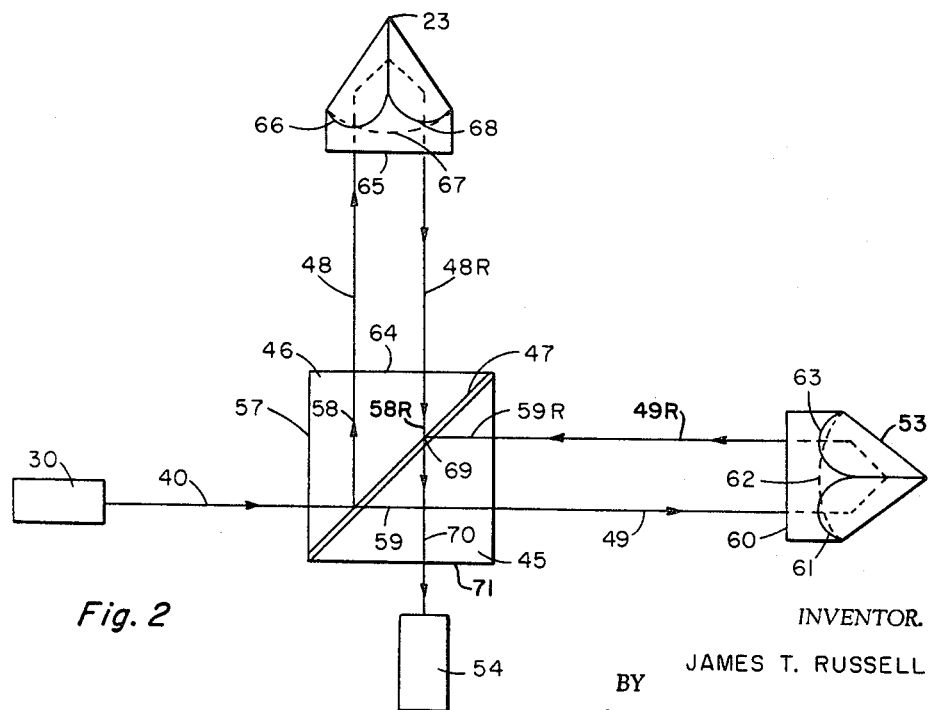
FIGURE 2 is a schematic view of the optical elements for measuring the acceleration of gravity.

FIGURE 2 is schematically illustrative of the optical elements utilized to detect the movement of a falling body so as to measure acceleration due to gravity. An optical light dividing prism is comprised of two 45°–45°–90° prisms 45 and 46 which are secured together along a semi-silvered interface 47 to form a square unitary light dividing element.

A well collimated beam of light 40 is projected by laser 30 towards face 57 of prism 46. The beam 40 enters the aforementioned prism and proceeds towards the semi-silvered beam dividing interface 47. Upon reaching the interface 47, the interface splits the entrant beam of light 40 into two beams 58 and 59 respectively.

One half of entrant beam 40 is transmitted directly through the semi-silvered beam dividing interface 47 to define the reference beam 59. Reference beam 59 exits prism 45 and continues as a beam of light 49 to enter plane surface 60 of tetrahedral prism 53.

The beam of light 49, after entering plane surface 60 of prism 53, is reflected by the first internal reflective surface 61, and directed toward the second reflective surface 62 defined by prism 53. The beam 49 is reflected by surface 62 and directed to the third reflective surface 63 defined by prism 53. The beam of light reflected from surface 63 is then directed outwardly from surface 60 of prism 53 along a beam pathway 49R to enter prism 45 for transmission along pathway 59R to the semi-silvered beam dividing interface 47.

Beam 58 perpendicular to the entrant beam 40 defines the measuring beam. Measuring beam 58 exits prism 46 at plane surface 64 and continues as a beam of light 48 to enter plane surface 65 of prism 23. Beam of light 48 upon entrance of prism 23 is reflected by the first internal reflective surface 66 defined by prism 23 to the second reflective surface 67. Light reflected from surface 67 is directed to the third reflective surface 68 defined by prism 23. Light reflected by the third surface 68 defined by prism 23 is then directed outwardly from surface 65 of prism 23 along a beam pathway 48R to enter prism 46 for transmission along a pathway 58R to the recombining portion 69 defined on the semi-silvered interface 47.

The reflected returned split measuring beam 58R is recombined with the reflectively returned reference beam 59R so that interference patterns or light fringes are formed at the recombining portion 69 on interface 47.

The recombined beam forming fringe patterns formed at portion 69 are transmitted along a path 70 to photodetector 54. Photodetector 54 is secured to plane surface 71 of optical light dividing means 43 and adapted to respond to the interference between measuring beam 58R and reference beam 59R at recombining portion 69 resulting in fringe patterns.

It will be apparent to those skilled in the art that the cyclic variation of the interference fringes produced at the recombining portion 69 is a function of the difference in the optical path lengths traveled by the fixed optical path length for the reference beam, i.e., 59, 49, 49R and 59R and the variable optical path for the measuring beam, i.e., 58, 48, 48R and 58R. The return beams from the tetrahedral are shown as being displaced laterally. For a particular ray this is so, however the laser beam is not a ray but rather 1 to 3 mm. in diameter, although it can be of any diameter in principle. Therefore, a beam directed at the apex of each tetrahedral will return on itself.

Thus, light fringe patterns at portion 69 are indicative of the movement of tetrahedral 23 with respect to dividing prism 43 in terms of the wave length of entrant light beam 40.

Therefore, for one complete cycle of light fringes at the recombining portion 69 of interface 47 to occur i.e., the field of illumination at the recombining portion 69 to change from dark to bright to dark there must be one wave length of difference between the reference beam 48 and the measuring beam. Since the measuring beam 48 is directed to and returned by tetrahedral reflector 23, to complete an optical path, tetrahedral 23 has to fall only a distance equal to one-half of the wave length of light of entrant beam 40 to effect a change complete cycle of light fringes at the recombining portion 69 on interface 47.

Figure 3:
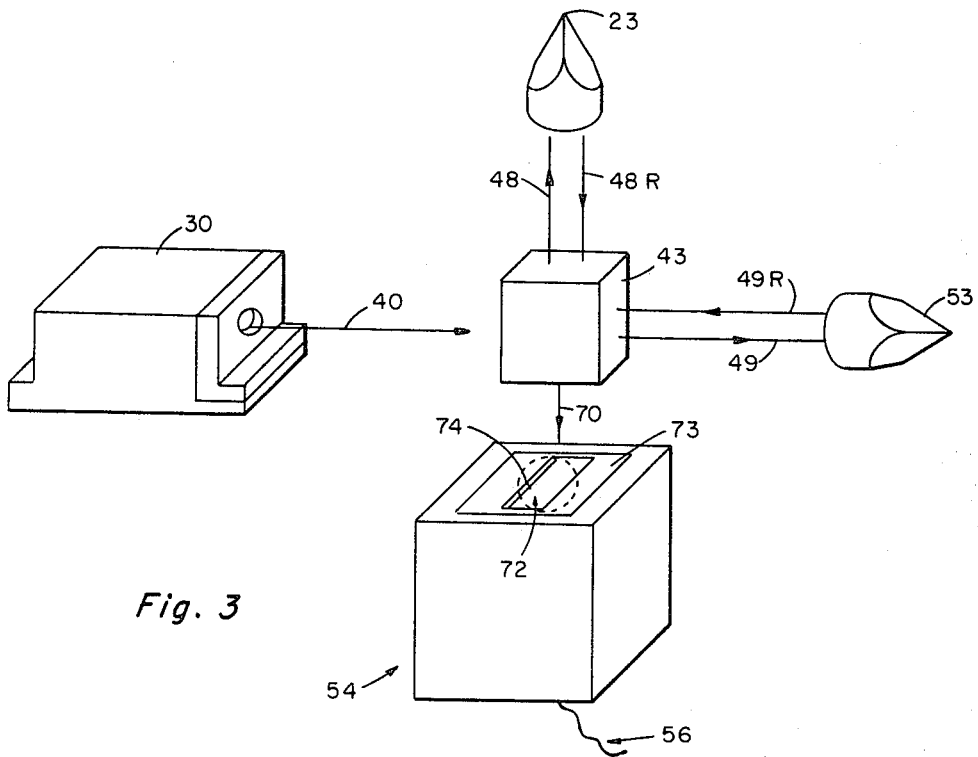
FIGURE 3 is an enlarged perspective view of the optical elements.

In FIGURE 3 the optical elements and the photodetector 54 are shown in perspective to illustrate the various optical paths. For simplicity, only beams of light as they enter or exit the prismatic element 43 are shown. The cyclic varying beam of light 70 constituting the fringe pattern due to interference is directed to photodetector 54 having a photocell 72. A shield 73 having an aperture 74 is disposed over the photocell 72 to increase the sensitivity of the photocell.

Figure 5:
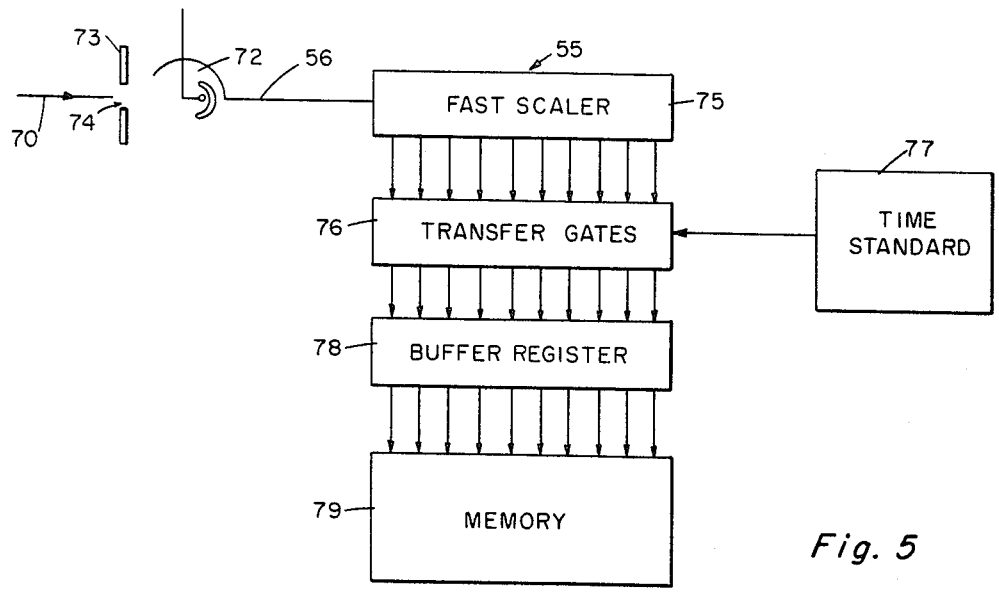
FIGURE 5 is a block diagram of an electrical circuit used in the one embodiment of the invention.

From the detector a signal is transmitted via conductor 56 to the fringe counting circuits 55. Fringe counting circuits 55 are shown in detail in FIGURE 5. The sine wave output of the high gain photocell 72 is transmitted via conductor 56 to a fast scaler 75. Fast scaler 75 has circuits to shape the sinusoidal output of photocell 72 into pulses before totalizing the fringe count in scaler 75. A 30 megacycle counting rate for scaler 75 is sufficent in the specific embodiment. A suitable fast scaler 75 would be a Hewlett-Packard Model 5245L/5251A or a Computer Measurement Co. Series 800. A transfer gate 76 is actuated by a time standard 77 so as to store the current pulse train total that is derived from photocell 72. Transfer gates 76 may be found in texts dealing with digital circuit techniques, under the heading "AND" gates and "NAND" gates. An example of a text would be Ledley, Digital Computer and Control Engineering 310 (1960). Time standard 77 can be calibrated with a receiver and the National Bureau of Standard, Radio Time Signals or with an atomic clock frequency standard. A buffer register 78 is provided to receive pulsed information from the scaler 75 through transfer gates 76. The buffer register 78 may comprise, for example, a set of bistable circuits (flip-flop) which hold a binary word equal to the number of pulses counted by the scaler 75 at the time of transfer. A suitable buffer register may be seen in Ledley, Digital Computer and Control Engineering 485, 487 (1960). The contents of the buffer are entered into a memory location in memory means 79. Memory means 79 can be any of the reasonably fast memories such as ferrite core memory, magnetic tape, and magnetic drum, or could be a fast printer. Each time the transfer gates operate the total count of scaler 75 is transferred to the buffer. The printer mechanism is simultaneously activated and it prints the contents of the buffer. After printing the pulse count the printer clears the buffer by resetting the buffer and the printer is advanced to the next position or memory location to await the next transfer. A suitable printer would be a Franklin Model 1000 or a Monroe Model MC–10–40.

Figure 6:
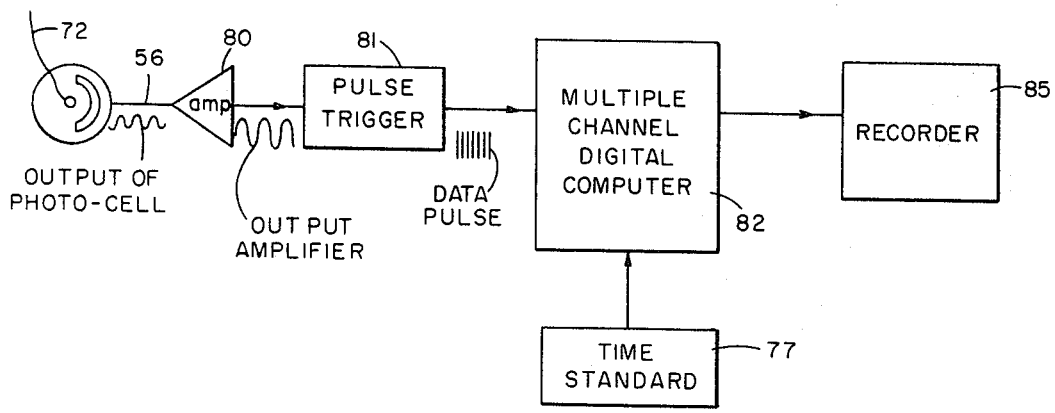
FIGURE 6 is a block diagram of a multiple channel digital computer used in one embodiment of the invention.

Fringe counting circuits 55 employing a multiple channel digital computor in combination with photocell 72 are shown in FIGURE 6. Conductor 56 transmits the output of photocell 72 to an amplifier 80 to increase the output of the photocell. The output of the amplifier 80 is fed to a pulse trigger 81 adapted to generate pulses having a repetition rate which is precisely equal to the varying sinusoidal output of the amplified photocell output. The output pulses of pulse trigger 81 are transmitted into a multiple channel digital computer 82 such as Radiation Instrument Development Laboratory Model 34–26, Syntec Model 150 (40 channels), or the Digital Equipment Corporation Model PDP–8.

Figure 7:
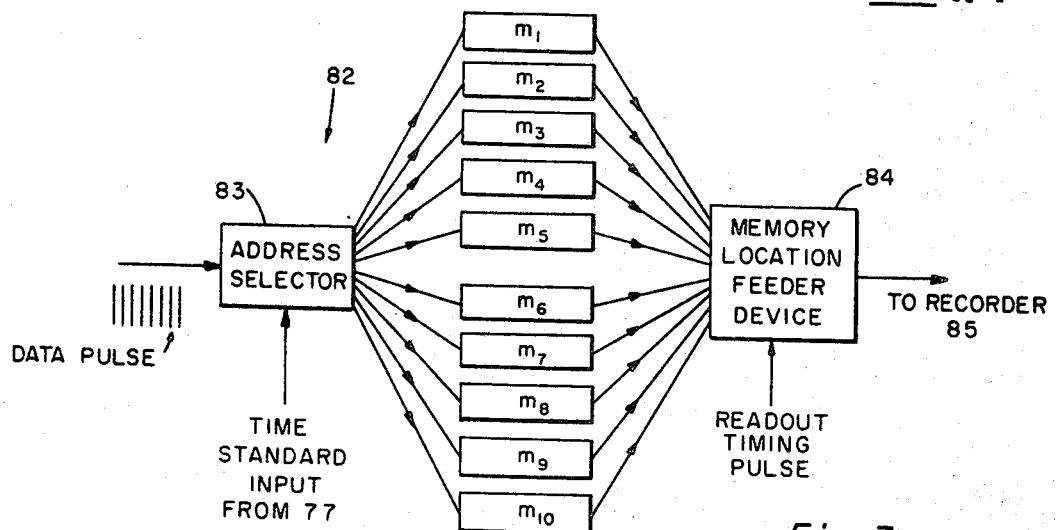
FIGURE 7 is a functional diagram of the multiple channel computer of FIGURE 6.

As shown functionally in FIGURE 7, the multi-channel computer 82 is comprised of a plurality of memory locations M, $M_2$, $M_3$, etc. called addresses (only ten are shown). These memory locations appear within a magnetic core memory matrix which acts to store the incoming pulses. Counter or scaler circuits which operate in conjunction with the memory locations add the pulses therein. The count accumulated is stored in the counter and can be read out any time. By means of an address selector 83 the incoming pulses are stepped from one memory address to the next. Selector 83 is controlled by the timing pulses from time standard 77 so that each time a timing pulse is applied, the selector directs the incoming data to the next consecutive location. Thus, pulses indicative of each cyclic change of the interference patterns on portion 69 of interface 47 are accumulated, counted and summated in one of the several memory channels to provide the digital sums of the pulses in a fixed interval of time. The counts contained in any memory address may be read out at any time by means of the memory read out device 84. The output of read out device 84 is transmitted to a recorder 85.

For use in measuring the acceleration of gravity, vessel 17 is first evacuated and sealed or a vacuum pump (not shown) is connected to vessel 17. Electromagnet 26 is energized by connecting a source of electrical power (not shown) to electromagnet 26 via electrical conductors 27. Electromagnetic ring 26 is elevated from its position adjacent to first support member 15 towards second support member 16. Initially before electromagnetic ring 26 is actuated the ring-shaped catcher and elevator 24 rests upon stops 22 so as to position catcher 24 and tetrahedral 23 rests upon catcher 24. Upon energization and elevation of electromagnetic ring 26, elevator 24 having tetrahedral 23 disposed thereon is elevated in vessel 17 by means of magnetic communication between electromagnet 26 and magnetic ring 25. Electromagnet 18 is energized by connection to a source of electrical power (not shown) via electrical conductors 21. Thus upon reaching the upper end of vessel 17, tetrahedral 23 is held by the magnetic attraction of electromagnet 18 upon the magnetic surface 28 coated on tetrahedral 23. Elevator and catcher 24 is then repositioned on stops 22 adjacent first support member 15 by sliding electromagnet 26 down the outside of vessel 17. Tetrahedral 23 is held by electromagnet 18 until the source of power (not shown) communicating with electromagnet 18 via conductors 21 is interrupted thus releasing the tetrahedral 23. The interrupting of the source of power to electromagnet 18 also actuates counting circuits 55 so that each cyclic variation detected at photodetector 54 corresponds to a half-wave length of movement of falling tetrahedral 23 when measured in terms of the wave length of laser 30.

Figure 8:
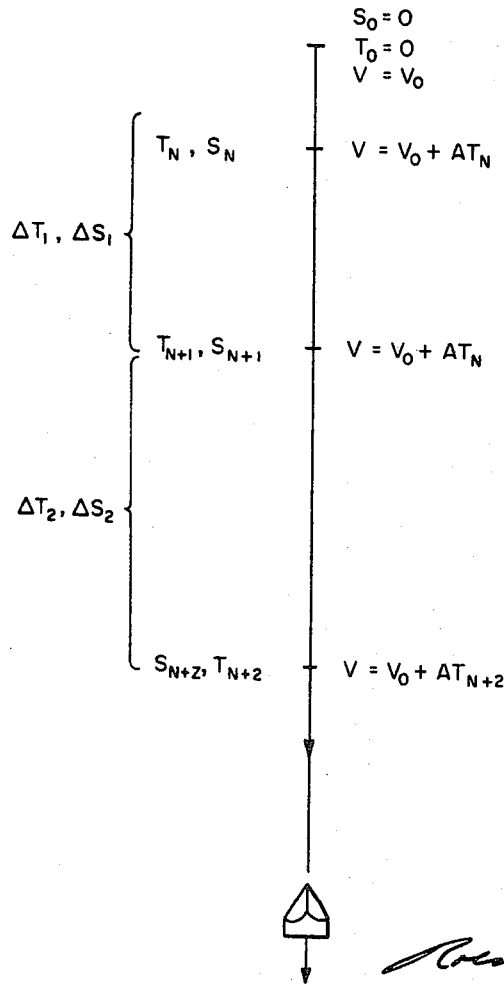
FIGURE 8 is a vector illustration of the vertical motions of a falling body associated with the invention.

With reference to FIGURE 8, prior to release of tetrahedral 23 by electromagnet 19 at time $T_0=0$, the distance fallen S, is equal to zero, and the velocity $V_0$ is undefined.

After the tetrahedral 23 is released by electromagnet 19 the general equation for the distance fallen after time T is:

$$S=V_0T+\tfrac{1}{2}AT^2$$

where

S=the distance fallen
$V_0$=the initial velocity
A=the acceleration of gravity
T=time The derivative is:

$$ds/dt=V_0+AT$$

This may be approximated by:

$$\Delta S=V_0\Delta T+AT\Delta T$$

Therefore, in an interval $\Delta S_1$, that tetrahedral 23 falls through vessel 17:

$$\Delta S_1=V_0\Delta T_1+AT_n\Delta T_1$$

Later in time tetrahedral 23 moves through a distance $\Delta S_2$ so that:

$$\Delta S_2=V_0\Delta T_2+AT_{n+1}\Delta T_2$$

now by equipment design, the increment of time may be made equal:

$$\Delta T_1=\Delta T_2=\Delta T$$

so that $$T_{n+1}=T_n+\Delta T$$

thus substituting the last two expressions into the expressions for $\Delta S_1$ and $\Delta S_2$ and taking the difference:

$$\Delta S_2-\Delta S_1=V_0\Delta T+A(T_n+\Delta T)\Delta T-V_0\Delta T-AT_n\Delta T$$

reducing to:

$$\Delta S_2-\Delta S_1=A\Delta T^2$$

If $\Delta T$ is equal .1 second then:

$$A=(\Delta S_2-\Delta S_1)100$$

As forementioned, the light fringe patterns at combining portion 69 are indicative of the movement of tetrahedral 23 with respect to prism 43 in terms of the wave length of laser light beam 40. For one complete cycle of light fringes at the recombining portion 69 to occur, tetrahedral 23 must have fallen one half the wave length of laser light source 30.

A photocell 72, adapted to receive the cycle change of light fringes at the recombining portion 69 of interface 47 converts the cyclic change of light to a sinusoidal electric voltage. The sinusoidal electrical voltage is converted by a pulse trigger 81 to pulses having a repetition rate which is equal to the cyclic change of light at recombining portion 69 of interface 47. Thus, for example, a change of light from dark to light to dark at recombining portion 69 is indicative that the tetrahedral prism has moved toward the optical light dividing means 43 one half the wave length of laser source 30 i.e., at a laser wave length of 6328 angstrom this corresponds to $3164\times10^{-10}$ meter.

As may be seen in FIGURE 6, the pulses enter multiple channel digital computer 82. As seen in FIGURE 7, the data pulses are entered in a memory location, for example $M_1$. These memory locations appear within a magnetic core memory matrix which acts to store the incoming pulses. Counter or scaler circuits which operate in conjunction with the memory locations add the pulses stored therein. By means of address selector 83 controlled by the .1 second time standard, the incoming pulse train is stepped from core memory location to the next at .1 second intervals. Thus memory location $M_1$ contains pulse information pertaining to the distance tetrahedral 23 falls during the first .1 second interval after release by electromagnet 18. At the end of .1 second address selector 83 steps the incoming pulses to the second memory location $M_2$ to store information as to the distance tetrahedral 23 falls during the interval of time between .1 and .2 second. At the end of .2 second address selector steps the input pulses to memory location $M_3$ to store the number of pulses proportional to the distance tetrahedral 23 falls during the interval of time from .2 to .3 second. The storing of pulses continues until catcher 24 breaks the fall of tetrahedral 23, after which the counting of pulses is discontinued. There exists in each of the several memory locations the digital sum of the pulses corresponding to the distance the tetrahedral has fallen in a fixed interval of time in terms of the laser wave length.

The counts contained in the memory locations for example, $M_1$ through $M_{10}$ may be read out at any time by actuating read out device 84. The output of the read out device 84 may be transmitted to a paper tape recorder 85. Thus there exists on the paper tape a series of readings $S_1$, $S_2$ and $S_3$ . . . $S_{10}$ corresponding to information stored in $M_1$, $M_2$ . . . $M_{10}$.

Picking the digital information correspond to two consecutive readings; for example $S_4$ and $S_5$ and substituting into Equation 1:

$$A = (S_5 - S_4) 100$$

where A is the acceleration due to gravity in terms of laser wave length.

However, since each pulse corresponding to a cyclic change at recombining portion 69 on interface 47 corresponds to tetrahedral 23 falling one-half a wavelength the result of Equation 1 must be divided in half.

The data collection may be done in the inverse manner, i.e., the fringe counting scaler can be set for a particular count, and the time required to reach that count is stored, whereby the acceleration due to gravity may be determined.

It will be understood that various changes in the details, material, steps and arrangements of parts, as for example, the substitution of a half reflecting mirror for prismatic dividing means 43 or a plane mirror for tetrahedral reference prism 53, which have herein described and illustrated in order to explain the nature of the invention may be made by those skilled in the art within the principle and scope of the invention as expressed in the appended claims.

What I claim is:

1. In a gravity meter:
   a vessel capable of holding a vacuum;
   a laser light source;
   unitary optical dividing means adapted to divide light from said source into two split beams one of which is directed in a vertical path;
   reflective means for defining a reference path for one of said split beams;
   reflector means reflectively returning said vertical beam and means adjacent one end of said vessel for releasing said reflector means for free fall and defining thereby a variable length measuring path for said vertical split beam; and
   means for recombining said split beams after reflection by said reflective means and said reflector means into one beam to produce thereat interference fringe patterns for measurement of movement of said free-falling reflector means.

2. In a gravity meter:
   a vessel capable of holding a vacuum;
   a laser light source;
   a dividing plate for dividing light from said source into a reference beam and a vertical measuring beam;
   reflective means for reflectively returning said reference beam along a reference path in a direction parallel to the entering reference beam to said dividing plate;
   reflector means releasably connected to one end of said vessel for free wall within said vessel and cooperable with said dividing plate for defining a variable length measuring path for reflectively returning said measuring beam along a vertical path in a direction parallel to the entering measuring beam to said dividing plate; and
   means for recombining said two reflectively returned beams to form a measurable interference fringe pattern.

3. In an instrument adapted to measure the acceleration of gravity:
   a vessel capable of holding a vacuum;
   an optical element provided with a semi-silvered beam dividing interface adapted to direct a reference beam outwardly along a reference beam pathway and for directing a measuring beam outwardly along a vertical measuring beam pathway;
   reflective means receiving said outwardly directed reference beam for defining a reference measuring pathway;
   a tetrahedral prism releasably connected to one end of said vessel for free fall within said vessel and for reflectively receiving the vertical measuring beam from said optical element thereby defining a variable length measuring pathway;
   a laser carried in fixed relationship to said optical element directing a beam of coherent monochromatic light toward said optical element for division thereby into two beams respectively directed to said reference beam pathway and said vertical measuring beam pathway;
   means for recombining said two beams, after reflection by said reflective means and said tetrahedral prism, into one beam to produce thereat interference fringe patterns for measurement of movement of said free-falling tetrahedral prisms; and
   photodetector means carried in fixed relationship to said recombining means so as to be actuated by said fringe patterns to produce a signal proportional to the movement of said tetrahedral prism with respect to said optical element.

4. The instrument according to claim 3 wherein said optical element is a half-reflecting mirror.

5. In a gravity meter:
   a vessel capable of holding a vacuum;
   a laser light source;
   optical dividing means for dividing light from said source into a reference beam and a vertical measuring beam;
   reflective means for defining a reference pathway for said reference beam;
   reflector means releasably connected to one end of said vessel for free fall within said vessel so as to receive said measuring beam from said optical dividing means and return thereto said measuring beam, said measuring beam varying in length according to the distance between said optical dividing means and said reflector means;
   means for recombining said beams after reflection by said reflective means and said reflector means to form a measurable interference fringe pattern; and
   photoelectric means responsive to the fringe pattern for determining the movement of said free-falling reflector means.

6. In a gravity meter:
   a vessel capable of holding a vacuum;
   optical beam splitting means;
   a laser light source carried in fixed relationship to said optical beam splitting means for directing light from said source to said beam splitting means for division thereby into two split beams one of which is directed in a vertical path;
   reflector means and means adjacent one end of said vessel for releasing said reflector means for free fall and defining thereby a length measuring pathway for said vertical split beam;
   reflective means adapted to direct the other of said split beams over a reference pathway;
   means for recombining said split beams after reflection by said reflective means and said reflector means into one beam to produce thereat measurable interference fringe patterns;
   photodetector means responsive to said fringe patterns for providing output signals representative of the distance said reflector means has fallen within said vessel;
   whereby said photodetector means provides output signals representative of the acceleration of gravity.

7. In a gravity measuring apparatus:
   a vessel capable of holding a vacuum;

a laser of the continuous type adapted to project a coherent beam of monochromatic light;

a unitary optical light dividing means to receive a beam of light from said laser for dividing the beam into two split beams one of which is directed in a vertical path;

a tetrahedral prism releasably connected to one end of said vessel for free fall within said vessel for defining a variable length measuring path for said vertical split beam, and for receiving and returning a variable length measuring beam to said dividing means;

reflective means for defining a reference pathway for the other of said split beams;

means for recombining said split beams after reflection by said reflective means and said tetrahedral means into one beam to produce thereat measurable interference fringe patterns;

a singular photodetector responsive to said recombined split beams from said recombining means;

a unidirectional counter responsive to said photodetector for indicataing the extent of movement of said tetrahedral prism with respect to said dividing means.

8. In combination with a laser:

a vessel capable of holding a vacuum;

a light reflecting tetrahedral prism releasably connected to one end of said vessel for free fall within said vessel;

an interferometer including:

a beam splitter for dividing light from said laser into two split beams one of which is directed in a vertical path;

reflective means for receiving and returning one of said beams over a reference pathway to said beam splitter, the vertical beam of the two beams being received and reflected by said tetrahedral prism to said beam splitter;

means for recombining said split beams after reflection by said reflective means and said tetrahedral prism into one beam to produce thereat measurable interference fringe patterns;

a singular photodetector responsive to said recombined split beams; and a continuous counter responsive to said photodetector to indicate the extent of movement of said tetrahedral prism for measuring the extent of movement of said tetrahedral prism with respect to said dividing means.

9. In a gravity measuring apparatus:

a vessel capable of holding a vacuum;

a laser of the continuous type adapted to project a coherent beam of monochromatic light;

a unitary optical light dividing means adapted to receive a beam of light from said laser for dividing the beam into two split beams one of which is directed in a vertical path;

a tetrahedral prism releasably connected to one end of said vessel for free fall within said vessel for defining a variable length measuring path for said vertical beam, and for receiving and returning a variable length measuring beam to said dividing means;

reflective means for receiving and returning the other of said split beams over a reference pathway to said dividing means;

means for recombining said split beams after reflection by said reflective means and said tetrahedral prism into one beam to produce thereat measurable interference fringe patterns;

a singular photodetector responsive to said recombined split beams from said recombining means;

pulse modulation means responsive to said photodetector for the production of a train of data pulses, the repetitive rate of said pulses varying in accordance with the number of interference patterns provided by said unitary optical light dividing means adapted for recombining the said split beams to provide interference patterns;

a computer including:

a multiplicity of channels for storing incoming pulses and for counting the number thereof;

an input selector for entering incoming pulses from said pulse modulation means sequentially into said channels;

a time standard pulse generator coupled to said selector to cause it to step sequentially from channel to channel;

readout means for sequentially deriving the count from each channel; and means coupled to said readout means for recording information stored in each channel;

whereby information recorded is indicative to the extent of movement of said tetrahedral prism in terms of the wave length of said laser with respect to said optical light dividing means.

References Cited

UNITED STATES PATENTS 3,302,027    1/1967    Fried et al. _____ 73—67.7 XR

RICHARD C. QUEISSER, *Primary Examiner.*

JOHN R. FLANAGAN, *Assistant Examiner.*